Aug. 9, 1966  C. C. VEALE  3,264,740
DEVICE FOR DETECTING DEFECTS IN ELONGATED ARTICLES
Filed Sept. 22, 1961  2 Sheets-Sheet 1
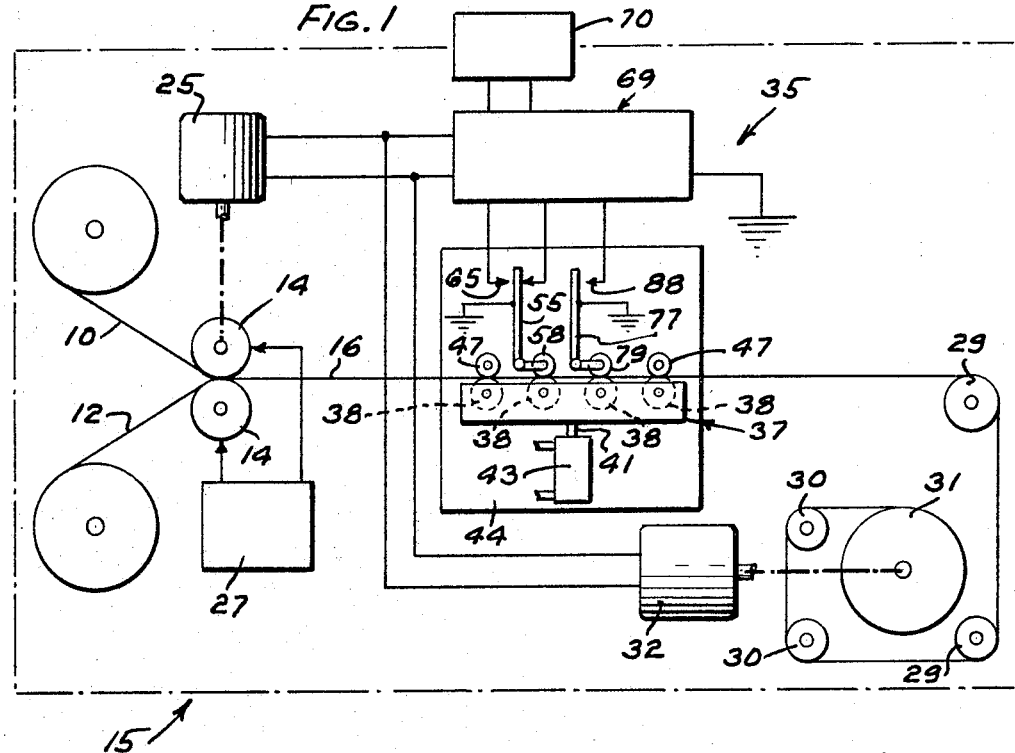
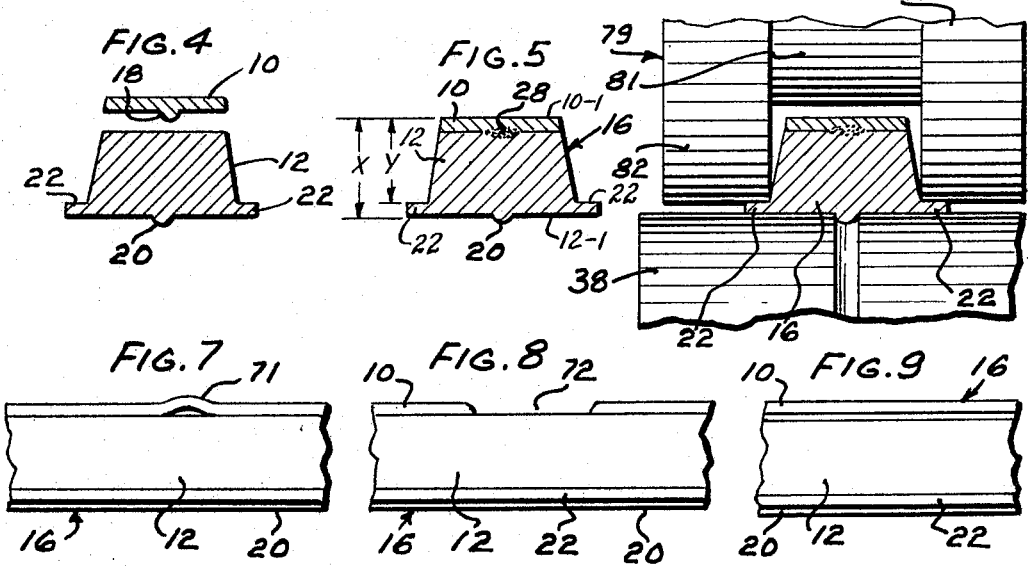
INVENTOR
C. C. VEALE
BY
A. C. Schwarz Jr.
ATTORNEY

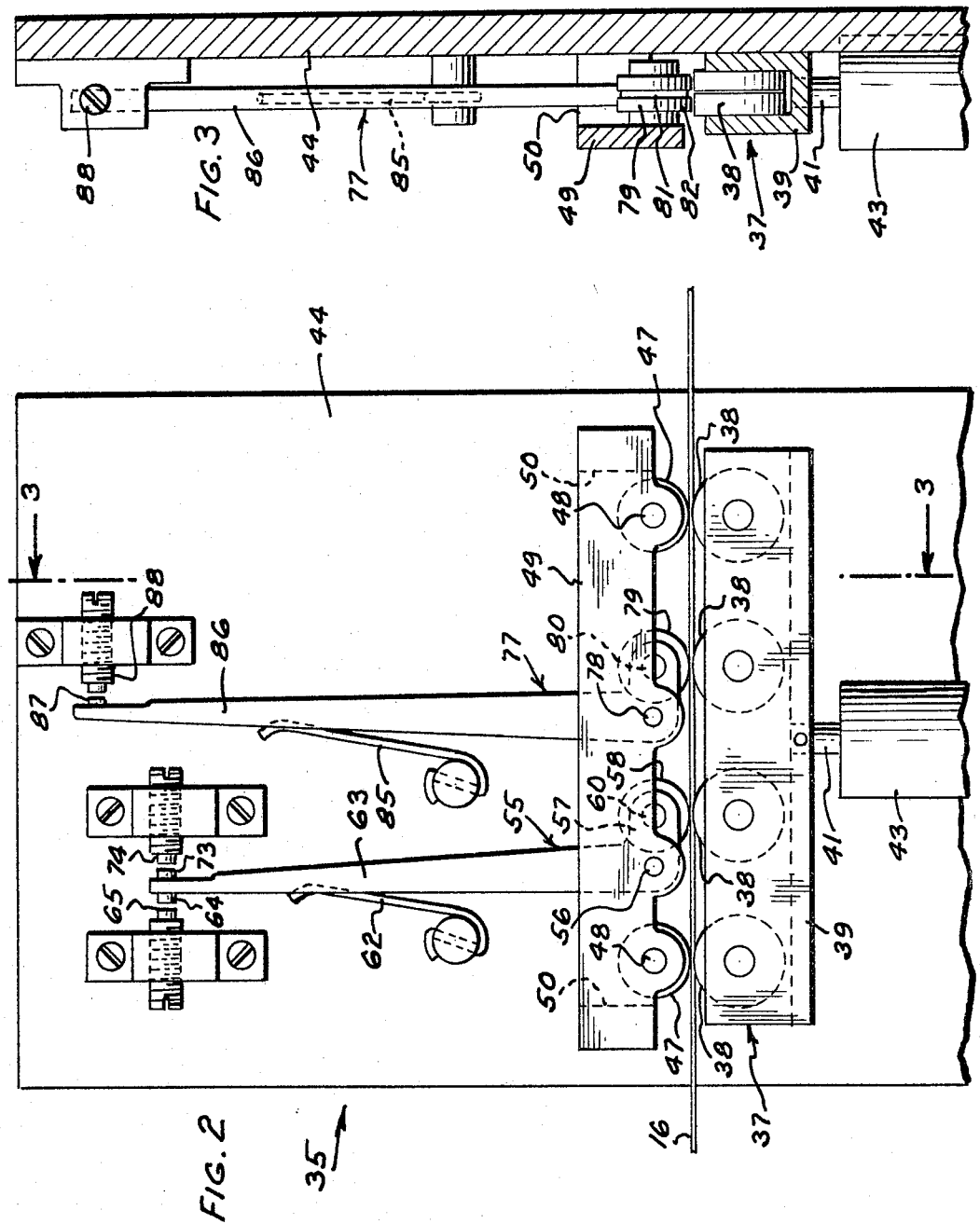

United States Patent Office
3,264,740
Patented August 9, 1966

3,264,740
DEVICE FOR DETECTING DEFECTS IN ELONGATED ARTICLES
Charles C. Veale, West Chicago, Ill., assignor to Western Electric Company, Incorporated, New York, N.Y., a corporation of New York
Filed Sept. 22, 1961, Ser. No. 140,088
3 Claims. (Cl. 33—148)

This invention relates to a device for detecting defects in elongated articles, and more particularly to a device in a bi-metal tape welding apparatus for detecting irregularities in the shape of the tape and to effect the stopping of the apparatus when such irregularities occur.

In the fabrication of one type of bi-metal tape from which electrical contacts are formed, a cap strip of precious metal is spot welded to a base strip of non-precious metal at relatively close intervals to provide an effective bond between the cap and base strips. In the absence of one or more spot welds in the bi-metal tape, the tape is rendered defective and a portion of the cap strip extends upwardly and forms a "pop-up" where the cap strip has not been welded to the base strip. Also, where a section of the cap strip is missing from the bi-metal tape the resulting bi-metal tape is rendered defective. Defective tape is also formed under conditions where the power level is temporarily inadequate during the welding of the bi-metal strip so that the cap strip is not heated to a temperature sufficiently high to permit the bead of the cap strip to be compressed enough to achieve a good weld and a bi-metal tape of the proper thickness.

An object of the present invention is to provide a device capable of detecting defects in elongated articles.

Another object of the invention is to provide in a bi-metal tape welding apparatus a mechanism for detecting irregularities in the shape of the tape and to effect the stopping of the apparatus when such irregularities occur.

A device illustrating certain aspects of the invention as applied to an apparatus for welding bi-metal tape may include a pair of spaced guide rollers which are mounted on a frame for rotation about fixed axes and which engage the upper surface of the bi-metal tape and serve to guide the tape along a straight path. The tape is yieldably maintained in engagement with the guide rollers by a platform which is urged toward the guide rollers and supports the tape along the bottom surface thereof for movement along such path. A feeler mounted on the frame between the guide rollers is spring urged to a normal position in engagement with the upper surface of the bi-metal tape. Protrusions on the upper face of the tape effect the movement of the feeler to a second position, and recesses formed in the upper surface of the tape effect the movement of the feeler to a third position. Mechanism under control of the feeler and responsive to the movement of the feeler to such second and third positions serve to actuate an indicator for indicating such defects and also to stop the operation of the welding apparatus.

A second feeler is provided which is in the form of a grooved roller having a pair of axially spaced cylinrical surfaces engageable with laterally extending flanges formed on one type of the bi-metal tape adjacent the lower face thereof. When defective tape of this type is formed having a thickness greater than a predetermined dimension the increased thickness of the tape lowers the position of the flanges thereon relative to guide rollers. The second feeler riding on these flanges is accordingly lowered from a normal position to effect the operation of the control mechanism to indicate such condition and to stop the welding apparatus.

Other objects, advantages and novel aspects of the invention will become apparent upon consideration of the following detailed description, in conjunction with the accompanying drawings, in which:

FIG. 1 is a diagrammatic view of an apparatus for spot welding a pair of metal strips into a bi-metal tape and showing the device embodying the present invention for detecting defects in the tape and for stopping the apparatus when such defects occur;

FIG. 2 is an enlarged front view of a portion of the device;

FIG. 3 is a vertical sectional view of the device taken along line 3—3 of FIG. 2;

FIG. 4 is a greatly enlarged cross-sectional view of the cap strip and base strip components of the tape in separated relation to each other;

FIG. 5 is an enlarged cross-sectional view of the bi-metal tape with the cap strip and base strip components in welded relation to each other;

FIG. 6 is an enlarged fragmentary view showing a tape passing between a pair of the rollers of the device; and FIGS. 7, 8 and 9 are fragmentary enlarged side views of the bi-metal tape having various types of defects therein.

Referring to the drawings, particularly FIGS. 1, 4 and 5, a cap strip 10 of precious metal is spot welded to a base strip 12 of non-precious metal between a pair of roll electrodes 14 of a welding machine 15 to form a bi-metal tape 16 from which electrical contacts are subsequently formed. As shown in FIG. 4, the cap strip 10 is relatively thin and of trapezoidal cross section with a welding bead 18 formed on the lower face thereof. The base strip 12 is relatively thick and of trapezoidal cross section with a welding bead 20 on the lower face thereof and with a pair of flanges 22 extending laterally from the lower portion thereof. When the cap strip 10 and the base strip 12 have been properly welded together the upper and lower surfaces 10–1 and 12–1, respectively, of the bi-metal tape 16 formed thereby are parallel to one another and are spaced apart a predetermined distance "X" (FIG. 5) and the flanges 22 of the bi-metal tape are disposed a predetermined distance "Y" from the upper surface 10–1.

The roll electrodes 14 are rotated by a suitable drive mechanism including a motor 25 to advance the tape 16 therethrough. Electrical pulses are supplied to the roll electrodes 14 by a suitable device 27 in timed relation to the movement of the tape 16 to effect the spot welding of the strips 10 and 12 together as shown at 28 in FIG. 5 at intervals sufficiently close to one another so that contacts severed from the tape 16 have the cap and the base components 10 and 12, respectively, firmly bonded to each other.

However, the spacing of the spot welds on the bi-metal tape 16 is such that in the event of omission of a spot weld 28 or two or more adjacent spot welds during the welding of the strips 10 and 12 the increased length of such non-welded interval between adjacent spot welds renders the tape defective inasmuch as contacts cut from portions of the tape in which a spot weld is omitted do not have the cap and base components 10 and 12 firmly welded together. The welding bead 18 of the cap strip 10 at such a non-welded interval between adjacent spot welds is not melted and bonded to the base strip so that this non-welded portion of the cap strip remains in a raised condition and forms a protrusion on the tape commonly referred to as a "pop-up."

The welded bi-metal tape 16 is advanced around suitable guide rollers 29 and distributing rollers 30 onto a take-up reel 31 which is actuated by suitable drive mechanism including a motor 32.

A device 35 is provided for detecting and indicating "pop-ups" and other defects in the bi-metal tape 16 and for effecting the stopping of the welding apparatus 15 when such defects occur. The device 35 is located adjacent to and following the welding electrodes 14 and includes a platform 37 engageable with the underside of the bi-metal tape 16 for supporting the tape for movement along a straight path. To reduce the frictional engagement of the tape with the platform 37, the platform is provided with a plurality of parallel laterally spaced rollers 38 rotatably supported between the side walls of a channel shaped frame 39 of the platform.

The platform 37 is mounted on the end of a piston rod 41, the piston of which is reciprocable in an air cylinder 43 that is secured to a vertical frame plate 44 suitably mounted on the welding apparatus. Compressed air admitted to the lower end of the cylinder 43 under control of a valve (not shown) moves the platform 37 upwardly to yieldably urge the bi-metal tape 16 against a pair of guide rollers 47 mounted for rotation about fixed axes. The rollers 47 have journals 48 supported in bearing apertures in the vertical frame plate 44 and in a bar 49 secured to the frame plate 44 and spaced therefrom by spacers 50. The tape 16 is thus held against the guide rollers 47 by the platform 37 and is supported thereby for advancing movement with the upper surface of the tape in a reference plane tangent to the guide rollers 47.

A feeler member 55 in the form of a bell crank is pivotally supported at 56 on the frame plate 44 and the bar 49. In the bifurcated end of the lever arm 57 of the bell crank 55 a feeler roller 58 is rotatably supported on a journal 60. A leaf spring 62 secured to the vertical frame plate 44 and engaging the long lever arm 63 of the feeler member 55 urges the feeler member for rotation in a clockwise direction to yieldably maintain the feeler roller 58 in engagement with the upper surface of the tape 16.

The feeler member 55 is electrically grounded to the frame by any suitable means, and at the upper end of the long lever arm 63 the feeler member is provided with a contact 64 on one side thereof which, in the normal position of the feeler member 55, is spaced a slight distance from an opposing contact 65. The contact 65 is mounted in insulated relation to the frame plate 44 and is connected to a circuit of a control device 69 for effecting the operation of an indicator 70 and the disconnection of the motors 25 and 32 from the power source to stop the welding apparatus in response to movement of the feeler member 55 into engagement with the contact 65.

From an inspection of FIG. 2, it will be seen that the ratio of the short and long lever arms 57 and 63 of the feeler member 55 is such as to impart a substantial multiplication of movement to the contact 64 relative to the movement of the feeler roller 58. The arrangement is such that in response to the movement of a portion of the tape 16 with a "pop-up" 71 thereon, as indicated in FIG. 7, the feeler roller 58 will be elevated sufficiently to move the feeler member 55 and the contact 64 thereon into engagement with the contact 65, thereby closing a circuit of the control device 69 to effect the stopping of the welding apparatus 15 and the actuation of the indicator 70 to indicate a defect in the tape.

In the event that the bi-metal tape 16 has a portion of the cap strip 10 missing as indicated at 72 in FIG. 8, a recess is thereby formed in the upper portion of the tape 16 into which recess the feeler roller 58 drops, resulting in the pivotal movement of the feeler member 55 in a clockwise direction as such defective portion of the tape passes beneath the feeler roller. A second contact 72 at the upper extremity of the long arm of the feeler member 55 is positioned in opposed and spaced relation to a contact 74 when the feeler member 55 is in its normal position. In response to pivotal actuation of the feeler member 55 in a clockwise direction, the contact 73 is moved into engagement with the contact 74 to close an operating circuit of the control device 69 to effect the disconnection of the motors 25 and 32 and the stopping of the welding apparatus 15 and the actuation of the indicator 70 to indicate the occurrence of a defect in the tape 16.

Defective tape is also formed when the power is supplied to the welding apparatus at a level lower than the specified normal level required for proper weld strength as previously indicated. Under such conditions, the cap strip 10 is not sufficiently heated and compressed to form a bi-metal tape of the proper thickness and in which the component strips are bonded to each other with sufficient strength. When tape of this type with its increased thickness passes between the presser rollers 38 and the guide rollers 47, the platform 37 is lowered an amount equal to the extent of excessive thickness of such defective tape over the thickness of the porperly welded tape.

To detect such deective tape, a second feeler member 77 is provided. The feeler member 77 in the form of a bell crank is pivotally mounted at 78 on the frame plate 44 and the bar 49 and has a feeler roller 79 rotatably supported on the short arm 80 of the feeler member. As shown in FIG. 6, the feeler roller 79 has a central annular groove 81 and a pair of circumferential flanges 82. The roller flanges 82 are spaced apart from each other to provide clearance for the portion of the tape extending above the tape flanges 22, and the roller flanges 82 have peripheral cylindrical surfaces engageable with the upper surface of the tape flanges 22. The roller 79 is yieldably maintained in engagement with the tape flanges 22 by a spring 85 secured to the vertical frame plate 44 and engageable with the upwardly directed long arm 86 of the feeler member 77.

A contact 87 mounted on the upper extremity of the feeler member 77 is positioned in spaced and opposed relation to a contact 88 when the roller 79 of the feeler member 77 is riding on the flanges 22 of a contact tape which has the components 10 and 12 properly welded together. As pointed out hereinabove, when a defective tape of the latter type described is advanced between the presser rollers 38 and the guide rollers 47, the tape flanges 22 will be disposed at a slightly lower elevation relative to the guide rollers 47 than the flanges on properly formed bi-metal tape 16 and under such circumstances, the feeler member 77 which is suitably grounded is rocked by the spring 85 in a clockwise direction to cause the contact 87 to move into engagement with the contact 88 to complete an operating circuit of the control device 69. This effects the actuation of the indicator 70 and the stopping of the welding apparatus 15.

Individual indicators 70 of various types, such as audible or visual signal devices, may be provided individually for each of the control circuits associated with the contacts 65, 74, and 88 if desired.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for detecting irregularities in an article of indefinite length having upper and lower surfaces and flange extending laterally therefrom adjacent to the lower surface and spaced a predetermined distance from said upper surface, the combination of mounting means, a pair of spaced guide members fixedly supported on said mounting means and engageable with the upper surface of the article for guiding the article along a straight path, support means engageable with the lower surface of the article, means for moving said support means toward said guide members to maintain the article in engagement with said guide members and for supporting the article for movement along said path, means for advancing said article along said path, a feeler member movably supported on said mounting means between said guide members and having a pair of feeler surfaces engageable with the flanges on the article, means for urging said feeler toward said support means to a normal position with the feeler surfaces in engagement with the flanges of the article, said feeler being moved to a second position in response to the movement therebeneath of a defective article having flanges spaced from said upper surface a distance different from said predetermined distance, and means actuated by the movement of said feeler to said second position for rendering said advancing means unoperative.

2. In a device for detecting irregularities in a bi-metal tape having upper and lower surfaces and flanges extending laterally therefrom and spaced a predetermined distance from said upper surface, the combination of mounting means, a pair of spaced guide rollers supported on said mounting means for rotation about fixed axes and engageable with the upper surface of the tape for guiding the tape along a straight path, a platform engageable with the lower surface of the tape, means for moving said platform toward said guide rollers to maintain the tape in engagement with said rollers and to support the tap for movement between the rollers in said path, means for advancing said tape along said path, a feeler movably supported on said mounting means between said guide rollers and having a grooved roller provided with a pair of peripheral feeler surfaces engageable with the flanges on the tape, resilient means for stressing said feeler in one direction to urge said feeler roller toward said platform to a normal position with the feeler surfaces in engagement with the flanges of the tape, said feeler being moved to a second position in response to the movement therebeneath of a defective tape having flanges spaced from said upper surface a distance different from said predetermined distance, and means actuated by the movement of said feeler to said second position for indicating such condition.

3. The structure as defined in claim 2 including the provision of means responsive to the movement of said feeler to said second position for rendering said tape advancing means unoperative.

References Cited by the Examiner

UNITED STATES PATENTS

| | | | |
|---|---|---|---|
| 1,133,300 | 3/1915 | McGauley | 33—148 |
| 1,149,018 | 8/1915 | Beregh | 226—11 X |
| 1,274,698 | 8/1918 | Edgecomb | 33—149 |
| 2,224,728 | 12/1940 | Gulliksen. | |
| 2,392,010 | 1/1946 | Stevens | 33—148 X |
| 2,401,576 | 6/1946 | Mason | 33—134 X |
| 2,794,258 | 6/1957 | Danielsson | 33—147 |

FOREIGN PATENTS 149,125   11/1931   Switzerland.

LEONARD FORMAN, *Primary Examiner.*

ISAAC LISANN, *Examiner.*

C. T. WOOD, N. F. MARTIN, *Assistant Examiners.*